United States Patent
Lewis

(10) Patent No.: US 9,405,926 B2
(45) Date of Patent: Aug. 2, 2016

(54) SYSTEMS AND METHODS FOR JURISDICTION INDEPENDENT DATA STORAGE IN A MULTI-VENDOR CLOUD ENVIRONMENT

(71) Applicant: Paul Lewis, Asbury, NJ (US)

(72) Inventor: Paul Lewis, Asbury, NJ (US)

( * ) Notice: Subject to any disclaimer, the term of this patent is extended or adjusted under 35 U.S.C. 154(b) by 43 days.

(21) Appl. No.: 14/251,612

(22) Filed: Jun. 30, 2014

(65) Prior Publication Data

US 2015/0379292 A1 Dec. 31, 2015

(51) Int. Cl.
*G06F 21/62* (2013.01)
*G06F 3/06* (2006.01)
*H04L 29/08* (2006.01)

(52) U.S. Cl.
CPC .......... *G06F 21/6218* (2013.01); *G06F 3/067* (2013.01); *H04L 67/1097* (2013.01)

(58) Field of Classification Search
CPC . H04L 67/1097; G06F 11/1076; G06F 3/067; G06F 2211/1028
USPC .................................................. 713/165, 193
See application file for complete search history.

(56) References Cited

U.S. PATENT DOCUMENTS

| | | | |
|---|---|---|---|
| 7,103,558 B1 * | 9/2006 | Patton .................. | G06Q 10/025 705/6 |
| 7,574,579 B2 * | 8/2009 | Gladwin ............. | G06F 21/6227 711/114 |
| 2003/0084020 A1 * | 5/2003 | Shu ..................... | G06F 11/1076 |
| 2004/0153952 A1 * | 8/2004 | Sharma ................ | H04L 1/0061 714/781 |
| 2005/0044561 A1 * | 2/2005 | McDonald ............. | H04H 60/58 725/18 |
| 2005/0125236 A1 * | 6/2005 | Agapi ..................... | G10L 15/24 704/275 |
| 2008/0183975 A1 * | 7/2008 | Foster ................. | G06F 11/1076 711/153 |
| 2008/0256143 A1 * | 10/2008 | Reddy ............... | G06F 17/30312 |
| 2009/0049260 A1 * | 2/2009 | Upadhyayula ........ | G06F 3/0608 711/162 |
| 2009/0300719 A1 | 12/2009 | Ferris | |
| 2010/0031086 A1 * | 2/2010 | Leppard .............. | G06F 11/2094 714/15 |
| 2010/0146375 A1 * | 6/2010 | Katz .................... | G11B 27/002 715/201 |
| 2010/0235887 A1 | 9/2010 | Burch et al. | |
| 2010/0299313 A1 | 11/2010 | Orsini et al. | |
| 2012/0110346 A1 * | 5/2012 | Resch ................. | H04L 67/1097 713/189 |
| 2012/0278622 A1 | 11/2012 | Lesavich et al. | |

OTHER PUBLICATIONS

International Search Report and Written Opinion issued on Dec. 24, 2015 during prosecution of International Application No. PCT/2015/038433.

* cited by examiner

*Primary Examiner* — Dao Ho
(74) *Attorney, Agent, or Firm* — Gearhart Law LLC.

(57) ABSTRACT

The present invention relates to a cloud based system for providing data security. The system comprises a processor which receives a data file from a user. The data file is directed to a first file location and encrypted and segmented into a plurality of data blocks. The plurality of data blocks is then assigned with a unique identifier and redirected to a plurality of cloud based storage providers. The plurality of cloud based storage providers are located in a plurality of jurisdictions. Each of the plurality of data blocks is then assigned a second file location. The unique identifier and the file locations of each of the plurality of data blocks is updated in the system.

18 Claims, 3 Drawing Sheets

SYSTEMS AND METHODS FOR JURISDICTION INDEPENDENT DATA STORAGE IN A MULTI-VENDOR CLOUD ENVIRONMENT

CLAIM OF PRIORITY

This application claims priority to U.S. provisional application No. 61/812,115 filed Apr. 15, 2013, the disclosure of which is incorporated herein by reference in their entirety for any purpose whatsoever.

FIELD OF THE EMBODIMENTS

This invention relates to data protection and security in a cloud based environment. In particular, the invention allows data to be stored in a cloud environment whereby it is inaccessible to any third party and not subject to data privacy laws of any given jurisdiction.

BACKGROUND OF THE EMBODIMENTS

With the advent of the internet, cyber security and data privacy is a growing global concern in today's world. Information technology and electronic discovery advances in a variety of industries, including the legal industry have compounded the issue. The United States and many foreign countries have enacted strict and stringent requirements on data privacy and security. Global entities and multinational corporations have struggled to comply with local data privacy laws. Data privacy laws define how companies and individuals must store and manage computer data. However, the laws are complex and sometimes the laws of one jurisdiction are in direct conflict with the laws of another jurisdiction. This has caused companies to give much thought as to how and where it stores their protected data. Because of the evolution of technology, companies are migrating away from managing and storing data internally, and opting instead to store data with a third party. The third party provider provides the physical infrastructure and maintains the data for a large number of customers. This scenario is generally known as the "cloud" or a virtual storage system. Such cloud based systems are used by many companies, but each is maintained by a single cloud service provider or "cloud vendor".

The development of the cloud has introduced many new challenges for companies. Customers are unclear as to what jurisdiction contains their inactive digital data (i.e. data at rest), since a cloud customer does not know where a cloud vendor maintains its actual physical infrastructure. Other challenges involve data security. Cloud environments can be compromised by hackers or by a company's internal employees ultimately leading to an organization's data being accessed or transferred. If the data is sensitive, such as personally identifiable information ("PII"), the company may be required to make a mandatory disclosure to its customers. In some cases, the company is not aware of such an invasion, and thereby may not make the disclosure they are required to make. In addition, a cloud vendor may go offline or go out of business, thereby creating a potential situation where a subscriber cannot access its own data. The present invention solves many of these and other challenges.

The present invention relates to a cloud based system including the creation of a system which causes computer data to be redundant and jurisdiction independent. In the present application, a data file is segmented and encrypted wherein each data file segment is striped across multiple cloud service providers. Thus, in the event each cloud service provider maintains physical storage in a different jurisdiction, then each encrypted segment will be at rest in a different jurisdiction. Therefore, each encrypted segment contains no readable data on its own, and must be reassembled with its other segments before the whole can be decrypted. Only once the segments from different jurisdictions are assembled can it be decrypted and read. The disclosed system enables a data file to be jurisdictionally independent until it is reassembled, and once the data is reassembled will it be able to be governed. The present application enables a company to subscribe to many cloud vendors, and not have to worry about their data at rest. For example, during the legal discovery process, a company can choose the jurisdiction for data production simply by reassembling its data in that jurisdiction.

SUMMARY OF THE EMBODIMENTS

The present embodiment of the invention relates to a cloud based system for providing data security. The system comprises a processor which receives a data file from a user. The data file is directed to a first file location and encrypted and segmented into a plurality of data blocks. The plurality of data blocks is then assigned with a unique identifier and redirected to a plurality of cloud based storage providers. The plurality of cloud based storage providers are located in a plurality of jurisdictions. Each of the plurality of data blocks is then assigned a second file location. The unique identifier and the file locations of each of the plurality of data blocks is updated in the system.

Encryption occurs via a processing engine. The unique identifier includes the name of the file and the quantity of data blocks. Redirection of the plurality of data blocks is executed according to a predetermined algorithm and controlled by a cloud queue engine. The first file location data of the data file and the second file location data of each of the plurality of data blocks is stored in a look up table of a storage director module of the system. The plurality of cloud storage providers is located in a different physical location than the data file. The plurality of data blocks may include a plurality of encrypted fragments which are stored in the lookup table of the cloud storage provider. The plurality of data blocks is transferred to the plurality of cloud storage providers via the storage director module. The storage director module manages access to the plurality of data blocks to ensure that the plurality of cloud storage providers in the plurality of jurisdictions do not have complete data of any one data file. Thus, reassembly of the data file is prevented by the plurality of data blocks being located in the plurality of cloud storage providers.

The present application discloses a computer implemented method for providing data security in a cloud based system. The method comprises: receiving, via a processor, a data file from a user; directing, via a processor, the data file to a first file location; encrypting, via a processor the data file, wherein said encrypted data file is split into a plurality of data blocks; assigning, via a processor, the plurality of data blocks with a unique identifier; updating, via a processor, the unique identifier of each of the plurality of data blocks within the system; redirecting, via a processor, the plurality of data blocks to a plurality of cloud storage providers located in a plurality of jurisdictions; storing, via a processor, the plurality of data blocks in the plurality of cloud storage providers; assigning, via a processor, a second file location to the plurality of data blocks; updating, via a processor, the unique identifier and the file locations of each of the plurality of data blocks in the system.

DESCRIPTION OF THE PREFERRED EMBODIMENTS

Figure 1:
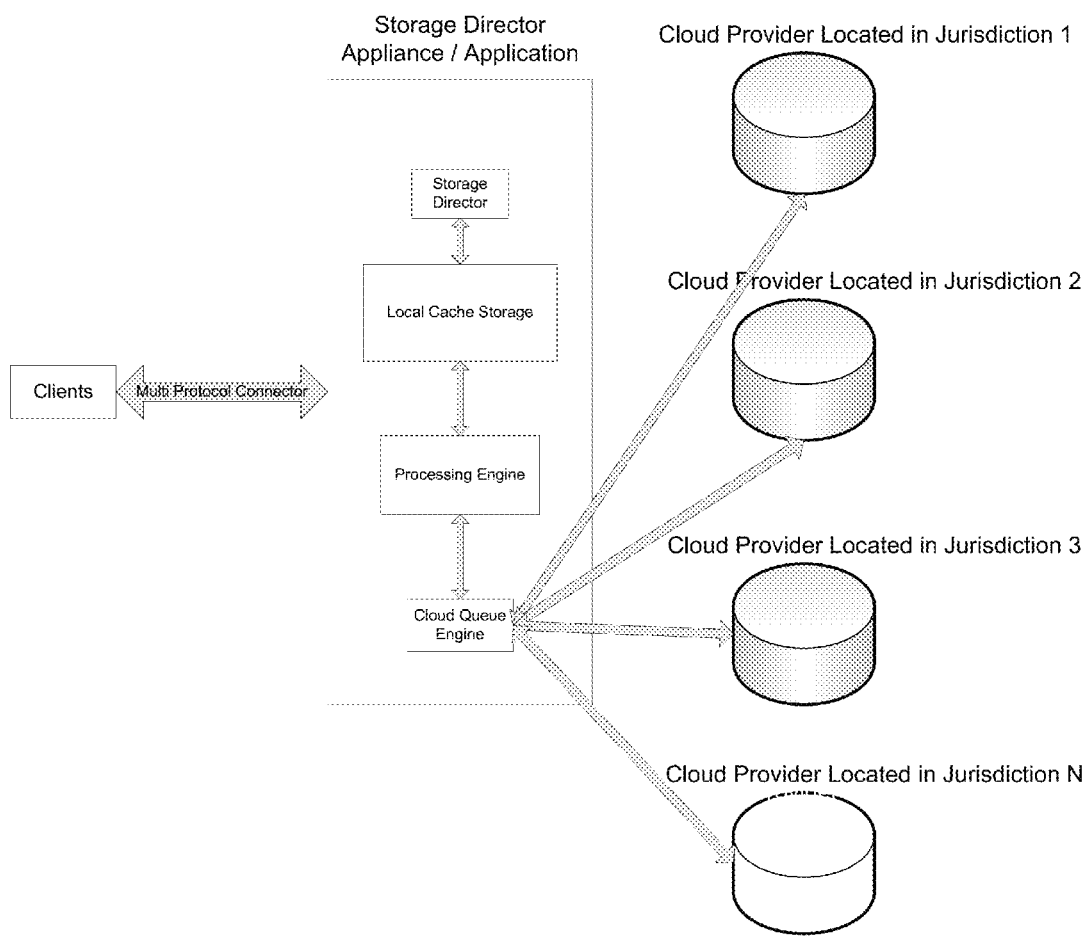
FIG. 1 shows the preferred embodiment of the system of the invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows the process flow of data through the cloud based system of the present application. The process commences with a native data file, the data file is encrypted and broken into segmented parts, and the segmented data file is then forwarded to multiple cloud storage providers located in multiple jurisdictions. A client (or multiple clients) connects to a Storage Director Appliance or Software Application through a Multi-Protocol Connector. The multi protocol connector may be via a web browser through the Internet. The Storage Director Appliance or Application has the ability to locally store a cached file in a local cache storage. The file is processed by a processing engine where it is encrypted and separated into "n" parts. Each of the parts are passed on to the Cloud Queue Engine, which transmits and deposits the segmented parts to multiple Cloud Providers located in multiple legal jurisdictions. When the file is requested by an authorized user, The Cloud Queue Engine retrieves a copy of each of "n" parts, downloads them to the Storage Director Appliance or Application, and processes the Segmented parts to re-create the original encrypted file. The encrypted file is decrypted, and the native file becomes available to the user.

Figure 2:
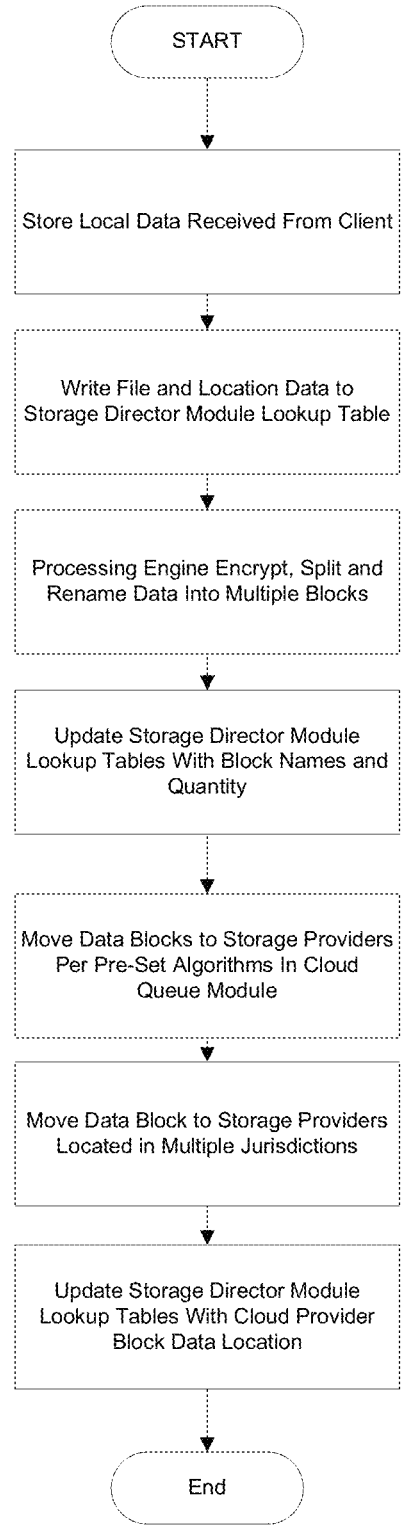
FIG. 2 show the preferred method of the invention.

FIG. 2 shows a flow chart diagram that describes the process of taking a native file and securely storing it in one of multiple cloud vendors located in more than one jurisdiction. To reassemble the file, the process is simply reversed. In step 1, local or native data is received from a Client and ready for processing. In step 2, the file and location data are written to the Storage Director module Lookup Table. In step 3, the file is processed by the Processing Engine, where it is encrypted. The encrypted file is then broken into multiple data blocks, and each block is assigned a unique name or identifier. In step 4, the Storage Director module Lookup table is updated with the block name of each data block and the total Quantity of blocks that were created from the original encrypted file. In steps 5 the data blocks are Forwarded and moved to storage providers as per a preset algorithm as instructed by the Cloud Queue Engine or Module. In step 6, the blocks are forward and moved to one of multiple cloud storage providers which are located in multiple jurisdictions as instructed by the Cloud Queue Engine or Module. The blocks are stored at cloud providers located in different jurisdictions. In step 7, the Storage Director module lookup table is updated with the data location of each block at each Cloud Provider.

Figure 3:
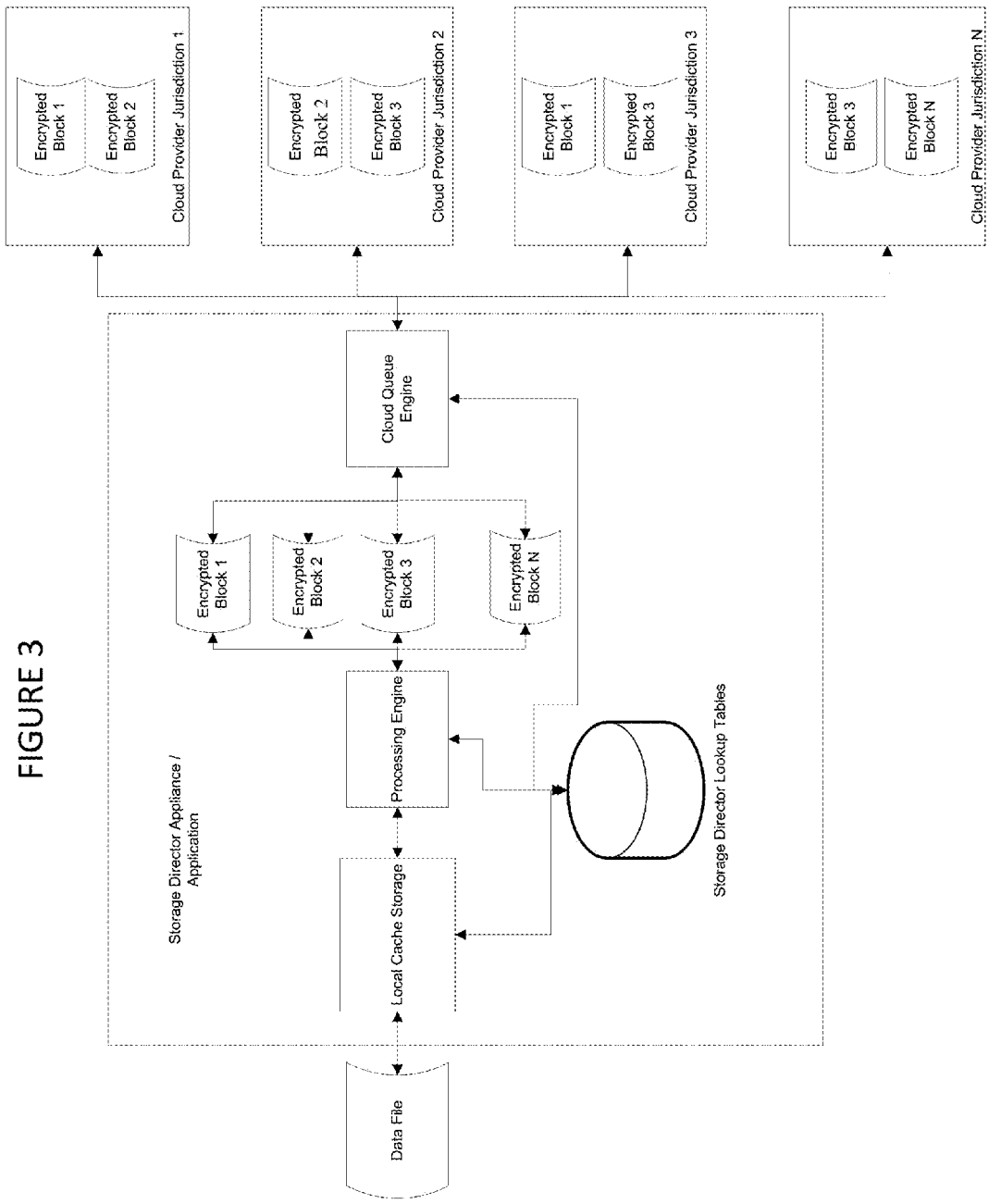
FIG. 3 shows a graphical representation of the flow of a data file and data blocks in the system.

In FIG. 3 a graphical representation of the data flow is shown. FIG. 3 also illustrates how data blocks are securely and redundantly stored across Cloud Providers in "n" jurisdictions. Once a native data file is encrypted and broken into data blocks by the Storage Director Appliance or Application, the Cloud Queue Engine or module distributes the blocks to "n" Cloud Providers in "n" legal jurisdictions. Each data block is written to two or more Cloud Providers, which "stripes" the data across multiple providers in varying jurisdictions. If a given Cloud Provider is compromised by going offline and unavailable, the Cloud Queue Engine can still retrieve the data blocks from another Cloud Provider. In addition, if a given Cloud Provider is compromised by a hacker or unauthorized user, the data blocks that may have been compromised are of no value to the hacker, because the hacker will only be in possession of encrypted blocks, and not any entire file.

The present embodiments relate to a systems and methods for secure data storage in a multi-vendor cloud environment in a manner that prevents the third party cloud provider from being able to access or be in possession of complete data files. The computer or device that creates the source data distributes only a portion of a data file to each of a plurality of cloud storage providers. The source computer or device maintains a lookup table and is able to re-assemble the data. Each storage provider only maintains part of each data file, and therefore is never in possession of any complete data file(s). The source computer or device can retrieve each portion of the file from multiple cloud providers, whereby the portions are re-assembled into the complete data file by using the lookup table. The system allows for large amounts of data to be stored across a plurality of third party cloud storage providers in a manner that prevents any third party from having access to any complete file. The data is distributed globally among a plurality of cloud storage providers. No single cloud provider has access to any complete file, as each file is broken into Encrypted segments or data blocks and only one Data block is sent to each cloud provider. Each cloud provider is in a different physical location across multiple jurisdictions. As a result, the file does not exist at rest in any one jurisdiction, thus is not subject to legal and/or regulatory requirements of any single jurisdiction while it is stored in a multi-vendor cloud environment.

The system ensures that any data file stored in a multi-vendor cloud environment in this manner cannot be subject to the laws governing production of, privacy of, or protection of data in any jurisdiction.

The advantages and features of the application are of a representative sample of embodiments only, and are not exhaustive and/or exclusive. They are presented only to assist in understanding and teach the claimed principles. It should be understood that they are not representative of all disclosed embodiments. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of a individual and/or enterprise user, database configuration and/or relational model, data type, data transmission and/or network framework, syntax structure, and/or the like, various embodiments of the system may be implemented that enable a great deal of flexibility and customization.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Descriptions herein of method steps and computer programs represent conceptual embodiments of illustrative circuitry and software embodying the principles of the disclosed embodiments. Thus the functions of the various elements shown and described herein may be provided through the use of dedicated hardware as well as hardware capable of executing software in association with appropriate software as set forth herein.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein.

Similarly, it will be appreciated that the system and process flows described herein represent various processes which may be substantially represented in computer-readable media and so executed by a computer or processor, whether or not such computer or processor is explicitly shown. Moreover, the various processes can be understood as representing not only processing and/or other functions but, alternatively, as blocks of program code that carry out such processing or functions.

The methods, systems, computer programs and mobile devices of the present disclosure, as described above and shown in the drawings, among other things, provide for improved social networking platforms and aspects thereof. It will be apparent to those skilled in the art that various modifications and variations can be made in the devices, methods, software programs and mobile devices of the present disclosure without departing from the spirit or scope of the disclosure. Thus, it is intended that the present disclosure include modifications and variations that are within the scope of the subject disclosure and equivalents.

What is claimed is:

1. A cloud based system for providing data security, the system comprising;
   a processor;
   a memory for storing instructions;
   said processor coupled to said memory to execute stored instructions;
   said process receives a data file from a user; and
   said processor, determining an amount of cloud based storage providers;
   said processor, then determining an amount of fragments said data file is segmented into;
   said processor, then encrypting and segmenting said data file into the same amount of fragments as the amount of cloud based storage providers;
   said processor, distributing the same amount of fragments to corresponding cloud based storage providers;
   wherein each fragment is further duplicated one or more times and distributed, via a processor, as a corresponding data block, to at least one additional cloud based storage provider; such that the reassembly of the fragments from any single cloud based storage provider will not result in a complete data file;
   wherein each of the fragments is assigned a unique identifier;
   wherein said cloud based storage providers are located in a plurality of geographic jurisdiction; and
   wherein the unique identifier is updated in the system.

2. The system of claim 1, wherein encryption occurs via a processing engine.

3. The system of claim 1, wherein each corresponding data block is assigned a unique identifier.

4. The system of claim 1, wherein redirection is controlled by a cloud queue engine.

5. The system of claim 1, wherein first file location data of the data file and second file location data of each of the fragments and corresponding data blocks is stored in a look up table of a storage director module.

6. The system of claim 1, wherein the plurality of cloud storage providers are located in more than one different physical geographic location.

7. The system of claim 1, wherein the corresponding data blocks are comprised of encrypted fragments.

8. The system of claim 1, wherein the corresponding data block and the encrypted fragments are stored in the lookup table of the cloud storage provider.

9. The system of claim 1, wherein the corresponding data block is transferred to the plurality of cloud storage providers via the storage director module.

10. The system of claim 1, wherein the storage director module is managing access to the corresponding data blocks to ensure that any of the cloud storage providers in the plurality of geographic jurisdictions do not have the complete data of any one data file.

11. The system of claim 1, wherein reassembly of the data file is prevented by the fragments and corresponding data blocks being located in different geographically located cloud storage providers.

12. A computer implemented method for providing data security in a cloud based system, the method comprising:
   receiving, via a processor a data file from a user;
   determining, via the processor an amount of cloud based storage providers;
   determining, via the processor, an amount of fragments said data file is segmented into;
   encrypting and segmenting, via the processor, said data file into the same amount of fragments that is determined by the amount of cloud based storage providers;
   distributing, via the processor, the amount of fragments to a corresponding cloud based storage providers;
   duplicating one or more times, via the processor, the fragments and distributing the fragments, via a processor, as a corresponding data block, to at least one additional cloud based storage provider; such that the reassembly of the data file from any single cloud as storage provider will not result in a complete data file; and
   assigning, via the processor, each of the fragments a unique identifier;
   and wherein said cloud based storage providers are located in a plurality of geographic jurisdictions; and
   updating, via the processor, the unique identifier in the system.

13. The method of claim 12, wherein encryption occurs via a processing engine.

14. The method of claim 12, wherein the corresponding data block is assigned a unique identifier.

15. The method of claim 12, wherein redirection is controlled by a cloud queue engine.

16. The method of claim 12, wherein first file location data of the data file and second file location data of each of the fragments and corresponding data blocks is stored in a look up table of a storage director module.

17. The method of claim 12, wherein the plurality of cloud storage providers are located in more than one different physical geographic location.

18. The method of claim 12, wherein the corresponding data blocks are comprised of encrypted fragments.

* * * * *